United States Patent [19]

Fürer et al.

[11] Patent Number: 5,005,437
[45] Date of Patent: Apr. 9, 1991

[54] DEVICE FOR CLEANING LUBRICATING OIL IN A GEARBOX

[75] Inventors: Gerd Fürer, Friedrichshafen; Karl-Fritz Heinzelmann, Meckenbeuren; Kurt Osterloff, Friedrichshafen, all of Fed. Rep. of Germany

[73] Assignee: Zahnradfabrik Friedrichshafen AG, Friedrichshafen, Fed. Rep. of Germany

[21] Appl. No.: 445,614
[22] PCT Filed: Jun. 30, 1988
[86] PCT No.: PCT/EP88/00580
§ 371 Date: Dec. 19, 1989
§ 102(e) Date: Dec. 19, 1989
[87] PCT Pub. No.: WO89/00260
PCT Pub. Date: Jan. 12, 1989

[30] Foreign Application Priority Data

Jul. 7, 1987 [DE] Fed. Rep. of Germany ....... 3722392

[51] Int. Cl.$^5$ ............................................. B62D 5/06
[52] U.S. Cl. ...................................... 74/467; 184/6.24
[58] Field of Search ................. 184/6.24, 6.25; 74/467, 74/468

[56] References Cited

U.S. PATENT DOCUMENTS

| | | | |
|---|---|---|---|
| 2,328,104 | 8/1943 | Simpson | 74/333 |
| 2,741,333 | 4/1956 | Dega et al. | 184/6.24 |
| 3,014,634 | 12/1961 | Giascosa | 233/32 |
| 3,143,187 | 8/1964 | Stefon | 184/6.24 |
| 4,644,815 | 2/1987 | Kawono et al. | 74/467 |
| 4,813,294 | 3/1989 | Vkai et al. | 184/6.25 X |
| 4,907,951 | 3/1990 | Wisner | 184/6.24 X |

*Primary Examiner*—Richard E. Moore
*Attorney, Agent, or Firm*—Herbert Dubno

[57] ABSTRACT

A process and device for cleaning lubricating oil in a gearbox with pressurized oil lubrication of bearings and gears is described wherein a lubricating oil pump delivers lubricating oil from a container, preferably the oil pan of the gearbox. In a shaft of the gearbox, preferably the input shaft, the lubricant channel is expanded into a rotation chamber. Flow velocity is thereby greatly reduced and the rotation of the outer surface of this chamber is imparted to the lubricating oil. As a result of this, the dirt particles are centrifuged onto the outer surface, where they form a firmly adhering film. The cleaned lubricating oil is drawn off in the center of the rotation chamber and conveyed in known manner via a bore provided in the main shaft to oil consumer parts, e.g. the bearings.

7 Claims, 2 Drawing Sheets

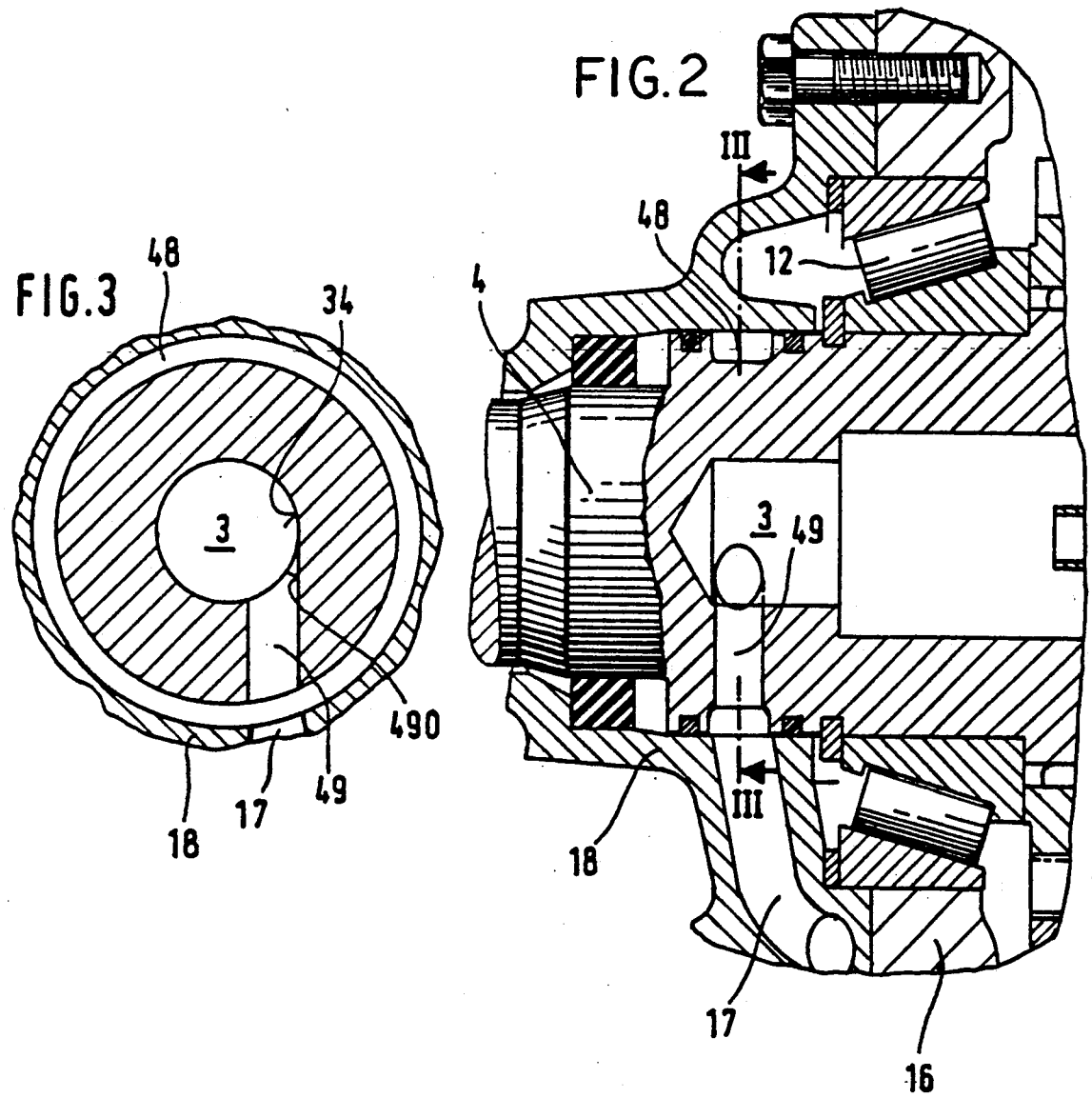

DEVICE FOR CLEANING LUBRICATING OIL IN A GEARBOX

BACKGROUND OF THE INVENTION

1. Field of the Invention

The present invention pertains to a device for cleaning lubricating oil in a gearbox.

2. The Related Art

It is common knowledge that improved lubrication and cooling of shafts and gear bearings as well as meshing teeth in high load gearboxes can be improved by means of a pressurized oil lubrication device. A lubricating oil pump, which delivers lubricating oil from an oil reservoir, preferably the oil pan of the gearbox, and feeds it specifically to the particularly heavily loaded gearbox elements, is arranged in or on the gearbox for this purpose. Filters are arranged in the suction line and, in the case of pumps disposed outside the gearbox, also in the delivery line in order to keep the contamination of the lubricating oil during the operation within bounds.

Determining the fineness of the filter is problematic. On the one hand, the finest dirt particles possible should be filtered out. On the other hand, the filter must be prevented from becoming clogged. Even if no general clogging develops, the flow rate through a very extensively clogged filter is considerably reduced, so that the lubricating and cooling of bearings that are especially at risk are impaired.

It is therefore the object of the present invention to improve the cleaning of lubricating oil in conjunction with its circulation in the gearbox by the simplest means possible.

SUMMARY OF THE INVENTION

The aforementioned and other objects of the present invention are achieved through a device for cleaning lubricating oil within a gearbox comprising:
an input shaft positioned within the gearbox;
a gearbox main shaft mounted within the input shaft;
a detent integrally molded onto the input shaft;
a lubricating oil pump driven by the input shaft;
a container receiving lubricating oil delivered from the pump;
a filter receiving the lubricating oil from the container;
a rotation chamber inside of the input shaft;
a lubricant channel arranged transversely to and entering radially into the rotation chamber, the channel communicating with the filter and receiving lubricating oil therefrom; and
a discahrge tube extending into a center of the rotation chamber, the discharge tube delivering lubricating oil centrifugally cleaned within the rotation chamber to shaft bearings, gear bearings and gears.

By utilizing the centrifugal force in the gearbox for removing dirt and metal particles from lubricating oil, it is possible to remove even very fine dirt particles without running the risk of reducing the amount of flow or completely stopping flow of the lubricating oil due to reduced flow rate, which could lead to the bearings running dry.

By arranging a rotation chamber in a gearbox shaft rotating at high speed, the lubricating oil is caused to rotate simply because of the increase in the diamater of a lubricant channel and the consequently reduced flow rate of the lubricating oil, so that the dirt particles will deposit on the outer surface of the rotation chamber. The cleaned lubricating oil can be subsequently conveyed from the center of this rotation chamber in a simple and known manner to the consumers, i.e., the shafts and gear bearings.

Thus, deposition of the dirt present in the lubricating oil on the outer surface of the rotation chamber is facilitated when the lubricating oil stream being delivered by the lubricating oil pump from a channel arranged transversely to the rotation space is interrupted via a tube extending in the longitudinal direction. The still contaminated lubricating oil will remain in an annular chamber close to the outer surface of the rotation chamber. If the lubricant channel from the lubricating oil pump is arranged tangentially to the outer surface rather than centrally, the still contaminated lubricating oil will enter even closer to the outer surface, and an additional twist will be imparted to it. This increases the centrifugal effect. By expanding this tube, the lubricating oil stream can be brought even closer to the outer surface. The dirt and abraded particles are compacted on the outer surface of the rotation chamber into a dirt film and adhere to it. The discharge tube extends into the rotation chamber, so that when the shaft has stopped, dirt particles that are not yet adhering or those which have not become immediately deposited on the end face will not enter the discharge. Using an annular magnet, at least over part of the outer surface, the cleaning of the lubricating oil can be further improved in terms of the removal of magnetic dirt particles, in addition to the cleaning effect of the centrifugal force. It is particularly advantageous to arrange the rotation chamber for cleaning the lubricating oil in the input shaft of a gearbox designed as a gear reducer unit, because the input shaft rotates at high speed, the lubrcating oil delivery pump is arranged on or near it, and molding the detent integrally on the input shaft causes an increase in diameter, which is favorable for the provision of the rotation space having a large outer diameter.

A centrifugal filter, which is arranged in conjunction with an internal combustion engine, is described in U.S. Pat. No. 3,014,634. A separate housing with partitions and a cover for closing are provided for the centrifugal filter, and its is driven via the crankshaft of the internal combustion engine. The separate housing is arranged in the belt pulley. A centrifugal oil filter is also arranged separately between a disk flywheel and the gearbox proper, which is a hydrostatic gearbox, in JP-A- No. 55/152952.

BRIEF DESCRIPTION OF THE DRAWING

These and additional features of the present invention will become more apparent from the following detailed description of preferred embodiments thereof when taken together with the accompanying drawing in which:

FIG. 2 shows a partial section with an oil channel, leading into the rotation chamber provided in the drive shaft, FIG. 3 shows a cross section of the oil channel, which is arranged tangentially to the outer surface of the rotation chamber.

DETAILED DESCRIPTION

Figure 1:
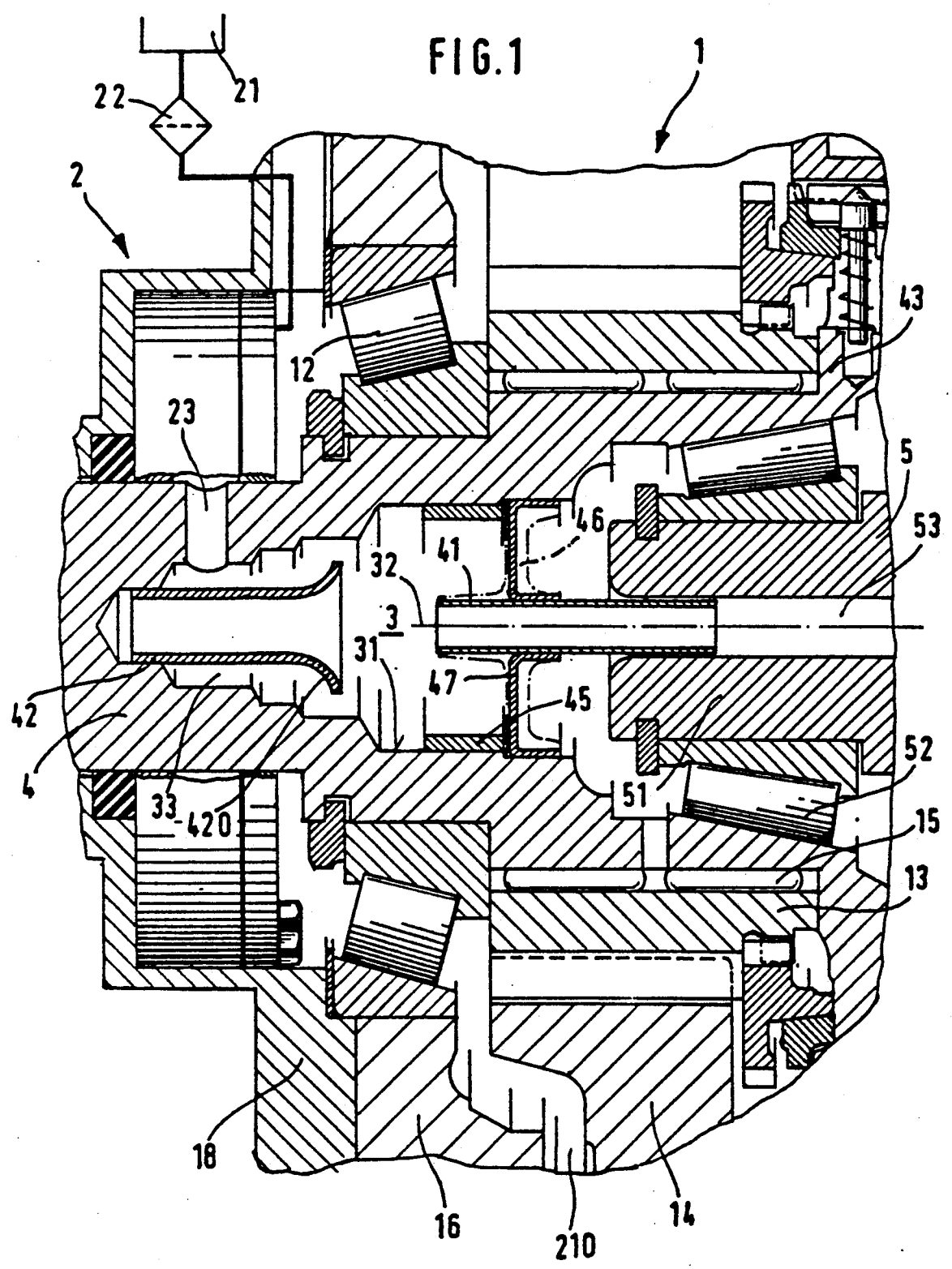
FIG. 1 shows a partial section of the arrangement of a rotation chamber inside a drive shaft of a gearbox with a lubricating oil pump on the drive shaft.

FIG. 1 shows a partial section a gearbox 1 in the area of the input shaft 4, which is mounted in bearing 12 in gear housing 16. The shaft drives a lubricating oil pump 2, which is arranged in a housing part 18 and draws the lubricating oil from a container 21, preferably from the oil pan 210 of the gearbox, via a filter 22 and delivers it via channel 23 into a rotation chamber 3. The rotation chamber 3 extends in the longitudinal direction of the gearbox input shaft 4 and expands to the largest possible diameter, which is relatively large as a consequence of a detent 43, molded in. On the front the, in the direction of the gearbox, said rotation chamber is closed off by a body 46, in the center of which a discharge tube 41 is molded in or fastened. As shown in the half section, said body 46 may consist, e.g., of a plastic part, which contains discharge tube 41 formed in one piece therewith. However, it may also be a part 47 made of sheet metal, on which said tube 41 is held. Tube 41 extends into a central bore 53 of a gearbox main shaft 5, which is mounted via its pin 51 and bearing 52 in the input shaft 4 of the gearbox. Yet another tube 42 with a funnel-shaped end 420 extends into the rotation chamber at least in the plane of channel 23. Discharge tube 41 also has a part projecting toward body 46 or sheet-metal part 47 in the direction of the rotation chamber. A gear 13, which meshes with a gear 14 arranged on the countershaft, is also provided on the gearbox input shaft 4 via, e.g., needle bearing 15.

FIG. 2 corresponds, in principle, to FIG. 1. Rotation chamber 3 is arranged within input shaft 4 in this case as well. Since the lubricating oil pump is arranged on the countershaft (not shown), the lubricating and cooling oil is fed via a channel 17, provided in housing 16, into an annular chamber 48 within gearbox input shaft 4. Thereafter the oil flows through a channel 49 which opens into the rotation chamber. As shown in FIG. 3, channel 49 is arranged tangentially 490 to the outer surface 34.

The process and the device for cleaning lubricating oil in the gearbox function as follows: Lubricating oil is drawn by a lubricating oil pump 2 from a container 21 or an oil pan 210 via a filter 22 and conveyed via channel 23 (FIG. 1) or 49 (FIGS. 2 and 3) into rotation chamber 3. The lubricating oil is deflected by the funnel-shaped expansion 420 of tube 42 in the direction of outer surface of the rotation chamber. Deflected oil then moves within annular chamber 33 while at the same time the flow decelerates as a consequence of the increase in the cross section in the axial direction toward discharge tube 41. As a consequence of the rotary movement of the gearbox input shaft 4 and of the outer surface 31, which is a relatively high-speed movement, the lubricating oil is also forced to rotate, and the dirt particles are centrifuged onto the outer surface. Cleaned lubricating oil is then drawn off from the center 32 via tube 41 and conveyed via bore 53 provided in said gearbox main shaft to the bearings, e.g., 15 and 12, in the known manner. A solid film of dirt, which also adheres when the gearbox is not running, is formed on the outer surface 31. To enhance the cleaning effect, it is also possible to arrange an annular magnet 45 on the outer surface 31 or on a part of the outer surface.

We claim:
1. A device for cleaning lubricating oil within a gearbox comprising:
 an input shaft positioned within said gearbox;
 a gearbox main shaft mounted within said input shaft;
 a detent integrally molded onto said input shaft;
 a lubricating oil pump driven by said input shaft;
 a container receiving lubricating oil delivered from said pump;
 a filter receiving said lubricating oil from said container;
 a rotation chamber inside of said input shaft;
 a lubricant channel arranged transversely to and entering radially into said rotation chamber, said channel communicating with said filter for receiving lubricating oil therefrom; and
 a discharge tube extending into a center of said rotation chamber, said discharge tube delivering lubricating oil centrifugally cleaned within said chamber to shaft bearings, gear bearings and gears.

2. A device according to claim 1 further comprising:
 a bore within said gearbox main shaft; and
 a body positioned to close off a front end of said rotation chamber, said discharge tube extending into said bore and being fastened to said body.

3. A device according to claim 2 wherein said body is formed in one piece with said discharge tube.

4. A device according to claim 1 further comprising a longitudinally extending tube arranged in said rotation chamber so that said lubricating oil being delivered by said lubricating oil pump is first conveyed axially into an annular space surrounding said longitudinally extending tube.

5. A device according to claim 1 wherein said lubricant channel is arranged tangentially to a surface defining outer limits of said rotation chamber.

6. A device according to claim 4 wherein an end of said longitudinally extending tube expands radially outward in a funnel shape at an end thereof, said end projecting into said rotation chamber.

7. A device according to claim 1 further comprising an annular magnet arranged at least on part of a surface defining outer limits of said rotation chamber.

* * * * *